United States Patent
Benner et al.

[11] Patent Number: 6,012,791
[45] Date of Patent: Jan. 11, 2000

[54] SWITCH CABINET WITH RACK AND WALL ELEMENTS

[75] Inventors: Rolf Benner, Herborn-Amdorf; Roland Winkel, Herborn, both of Germany

[73] Assignee: Rittel-Werk Rudolf Loh GmbH & Co. KG, Herborn, Germany

[21] Appl. No.: 08/996,990

[22] Filed: Dec. 2, 1997

Related U.S. Application Data

[63] Continuation of application No. PCT/EP96/02315, May 30, 1996.

[30] Foreign Application Priority Data

Jun. 1, 1995 [DE] Germany ............................ 195 20 084

[51] Int. Cl.[7] .................................................. A47B 47/00
[52] U.S. Cl. .................................... 312/265.2; 312/265.5; 312/265.6
[58] Field of Search ................................ 312/263, 265.1, 312/265.2, 265.3, 265.4, 265.5, 265.6; 403/230, 231, 384, 388

[56] References Cited

U.S. PATENT DOCUMENTS

| | | | |
|---|---|---|---|
| 1,919,780 | 7/1933 | Fairbank | 403/231 X |
| 1,972,108 | 9/1934 | Richardson . | |
| 2,912,294 | 11/1959 | Wells et al. | 312/111 |
| 3,297,374 | 1/1967 | Radek | 312/265.5 X |
| 3,297,383 | 1/1967 | Fay | 312/265.4 |
| 4,103,981 | 8/1978 | Donahue et al. | 312/265.6 |
| 4,179,169 | 12/1979 | Daniels et al. | 312/265.4 |
| 4,518,279 | 5/1985 | Suttles | 403/231 |
| 5,020,866 | 6/1991 | McIlwraith | 312/265.4 |
| 5,228,762 | 7/1993 | Mascrier | 312/265.1 X |
| 5,259,691 | 11/1993 | Moore et al. . | |
| 5,380,083 | 1/1995 | Jones et al. | 312/265.6 X |

FOREIGN PATENT DOCUMENTS 991777  10/1951  France ................. 312/265.5

*Primary Examiner*—Peter M. Cuomo
*Assistant Examiner*—Hanh V. Tran
*Attorney, Agent, or Firm*—Jansson, Shupe, Bridge & Munger, Ltd.

[57] ABSTRACT

A switching cabinet has a frame made of stays and with open sides that may be at least partially closed by wall elements that can be secured to the stays of the framework. In order to secure the wall elements to the framework in an manner invisible from the outside, projecting hook elements are fixed on the inner side of the wall elements, matching hook elements can be hooked into said projecting hook elements and the matching hook element can be mounted on the framework stays so that the hook elements may be hooked onto them.

4 Claims, 4 Drawing Sheets

SWITCH CABINET WITH RACK AND WALL ELEMENTS

RELATED APPLICATION AND CLAIM OF PRIORITY

This application is a continuation of PCT Application No. PCT/EP96/02315 having an international filing date of May 30, 1996.

FIELD OF THE INVENTION

The invention relates to a switch cabinet with a rack constructed of rack members the open sides of which can, at least in part, be closed with wall elements, whereby the wall elements can be fastened to the rack members of the rack.

BACKGROUND OF THE INVENTION

In known switch cabinets, wall elements are usually screwed directly to rack members forming a rack. Thus, the rack members can bear recessed fastening flanges with fastening bore holes. With this type of fastening, the fastening points are visible on the outside. Additionally, the wall elements must be provided with fastening bore holes at the appropriate locations.

OBJECTS OF THE INVENTION

It is the object of this invention to allow for attachment of wall elements to the rack of a switch cabinet in a simple manner, so that the wall element can be completely closed on the outside and such that the fastening points are not visible or recognized from the outside.

SUMMARY OF THE INVENTION

This object is accomplished according to the invention in that projecting hook elements are rigidly attached on the inside of the wall elements, the counter hook elements are attached to the rack members in such a manner as to allow them to hook the projecting hook elements.

The projecting hook elements and counter hook elements form fastening points that require only simple components. The fastening points are automatically produced during attachment of the counter hook elements to the rack members. The counter hook elements are hung in the projecting hook elements that are fastened to the wall element and then the counter hook elements are attached (screwed) to the rack member. The assembly is very simple to carry out.

In certain embodiments, the counter hook elements can be attached to the rack member perpendicular to the wall element and can be adjusted, thus allowing the wall element to be tightened on the rack.

In accordance with one embodiment it is provided that the projecting hook elements are designed as angled pieces, one member of which is fixed to the wall element and the other member of which projects from the wall element and extends into a hook-shaped inwardly bent end section at the free end. This embodiment of the projecting hook element is independent of the design and attachment of the counter hook elements on the rack and offers a wide range of opportunities to hang the counter hook elements. The positioning of the counter hook elements on the rack thus provides a certain degree of tolerance.

The construction of the counter hook element depends on the orientation of the fastening surface on the rack. Thus, according to one embodiment, it can be provided that the counter hook element is designed as a fastening plate that on one end transitions into a hook-shaped inwardly bent counter end section, and that the fastening plate can be screwed onto a fastening surface of the rack member, said fastening surface being parallel to the wall element, whereby the counter end section projects from the rack member for the insertion of the end section of the hook element. Or, the counter hook element may be designed as an angled piece one member of which is screwed onto a fastening surface of the rack member, said fastening surface being perpendicular to the wall element, and the other member projecting from the rack member parallel to the wall element such that the member that projects parallel from the wall element transitions into a hook-shaped inwardly bent end section, into which the end section of the hook elements can be inserted.

An adjustable embodiment is characterized in that the counter hook element is designed with a clamp shape the lateral member of which has on one end the shape of a hook into which the end section of the projecting hook element can be inserted. Adjustment is provided by the combination of a fastening block having a threaded bore hole and a set screw within the bore hole secured in such a manner that it cannot be lost. The fastening block is guided between the lateral members and can be adjusted. It is supported on a fastening surface that extends parallel to the wall element or is inserted with one part into a fastening receptacle of a fastening surface of the rack member, said fastening surface being perpendicular to the wall element; alternatively, the fastening block is inserted into a mounting rail that is connected to the rack member.

Support of the fastening block on the rack can be implemented such that the fastening block is provided with fixing pins that can be inserted into fastening bore holes of the fastening surface of the rack member, said fastening surface being parallel to the wall element. Alternatively, the fastening block can be inserted in a mounting rail connected to the rack member, or can have a hook attachment that hooks the fastening receptacle of the rack member or a mounting rail that is connected to the rack member on the side that faces away from the wall element.

This type of fastening for the wall elements also has application for a switch cabinet wherein at least a part of the rack members bordering the open sides are beveled at the joining wall element.

The invention is explained in further detail on the basis of the exemplified embodiment illustrated in the drawings.

DETAILED DESCRIPTION OF PREFERRED EMBODIMENTS

Figure 1:
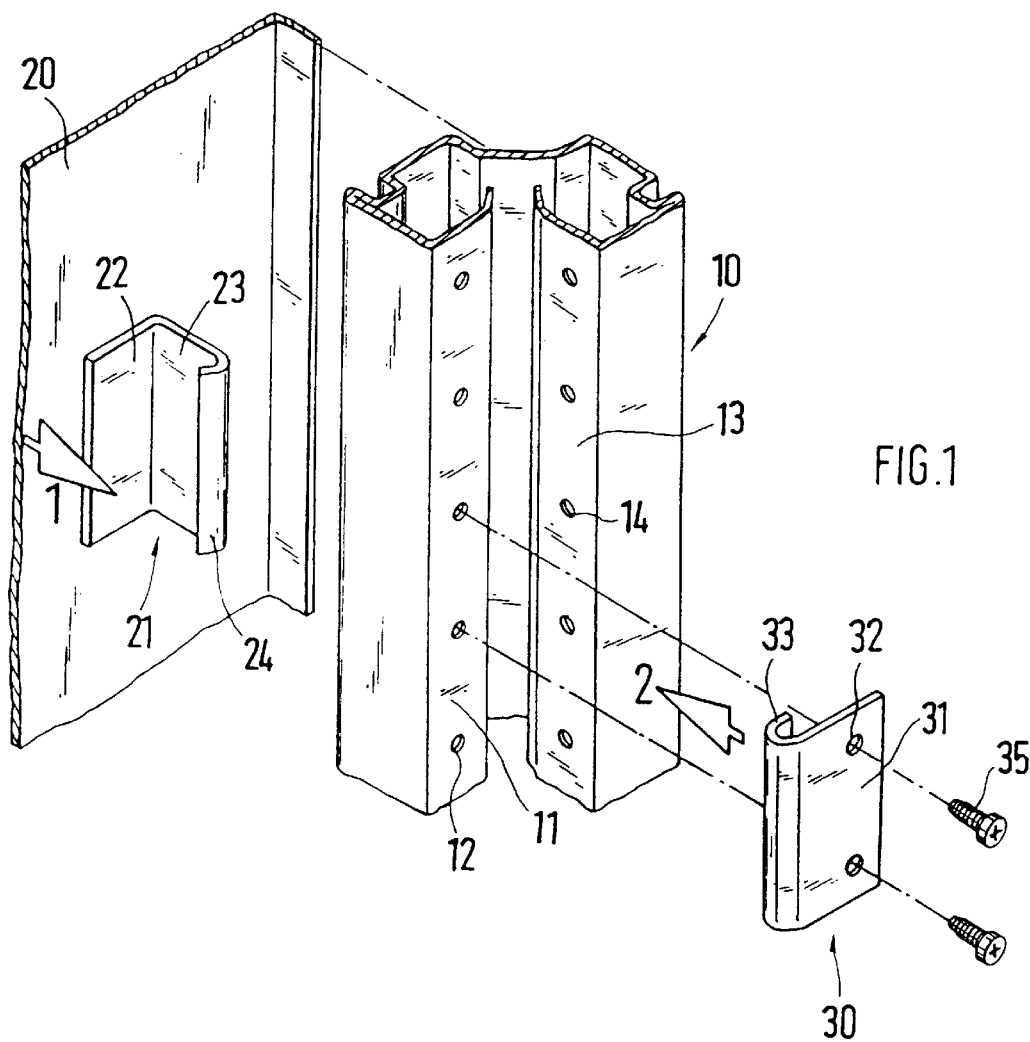
FIG. 1 is an exploded perspective view of a fastening location between a wall element and a rack member.

The partial view according to FIG. 1 shows a part of a wall element 20 that is provided with a beveled edge, as well as a facing section of a rack member 10 of a rack of a switch cabinet. In this case it can be either a vertically or a horizontally oriented rack member 10 of the rack.

On the inside of wall element 20, hook elements 21 are rigidly attached to the fastening positions. Hook elements 21 are designed as angled pieces in this embodiment. Hook elements 21 are rigidly connected to wall element 20 by an inner member 22. An extension member 23 projects perpendicular to wall element 20 and is oriented parallel to the longitudinal direction of rack member 10. At its free end, extension member 23 is bent inward in a hook shape, as can be seen in an end section 24.

Figure 2:
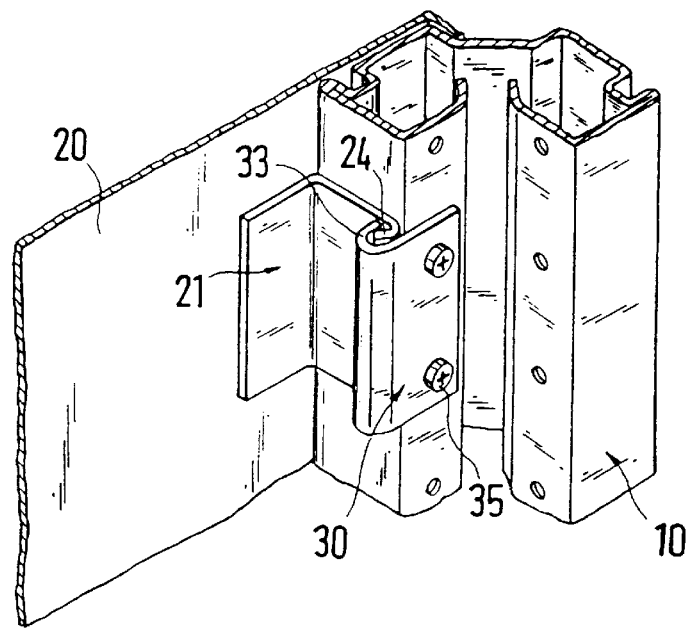
FIG. 2 is a perspective view of the device of FIG. 1 in a position of engagement.

In the exemplified embodiment, an open, hollow profile piece is used for rack member 10, featuring fastening surfaces (profile sides) 11 and 13 in the area of the inner edge. Fastening surfaces 11 and 13 are perpendicular to each other and include fastening bore holes 12 and 14, respectively. A fastening plate 31 with fastening bore holes 32 is used as the counter hook element and is screwed into fastening bore holes 12 on fastening surface 11 of rack member 10 by means of screws 35. Wall element 20 is joined to rack member 10 in the direction indicated by arrow 1. Fastening plate 31 is screwed, in the direction indicated by arrow 2, onto rack member 10 such that hook-shaped, inwardly bent end section 33 is oriented on the free edge, thereby allowing fastening plate 31 to be hung onto end section 24 of hook element 21. The layout is such that fastening plate 31 projects beyond fastening surface 11 with end section 33 to the extent that the hook connection is seated, as can be seen in FIG. 2. The hook connection has a sufficient width such that tolerances in the longitudinal direction of rack member 10 can be equilibrated. Extension member 23 of hook element 21 can be supported by rack member 10 in the resulting connection such that an definite positioning of wall element 20 can also be achieved in the plane of wall element 20.

A counter hook element 30, configured as an angled piece, can also be used on rack member 10 if wall element 20, with hook element 21, remains unchanged. Such a counter hook element includes a first member parallel to and fastened to surface 13, a second member at right angles to the first member (i.e., parallel to and, preferably, against surface 11) and a hook-shaped end section 33 along the edge of the second member.

Again referring to fastening plate 31, such plate transitions into the perpendicular member with which counter hook element 30 can be screwed to fastening surface 13 of rack member 10, said surface being perpendicular to wall element 20. Fastening plate 31 is thereby supported on fastening surface 11 of rack member 10.

Figure 3:
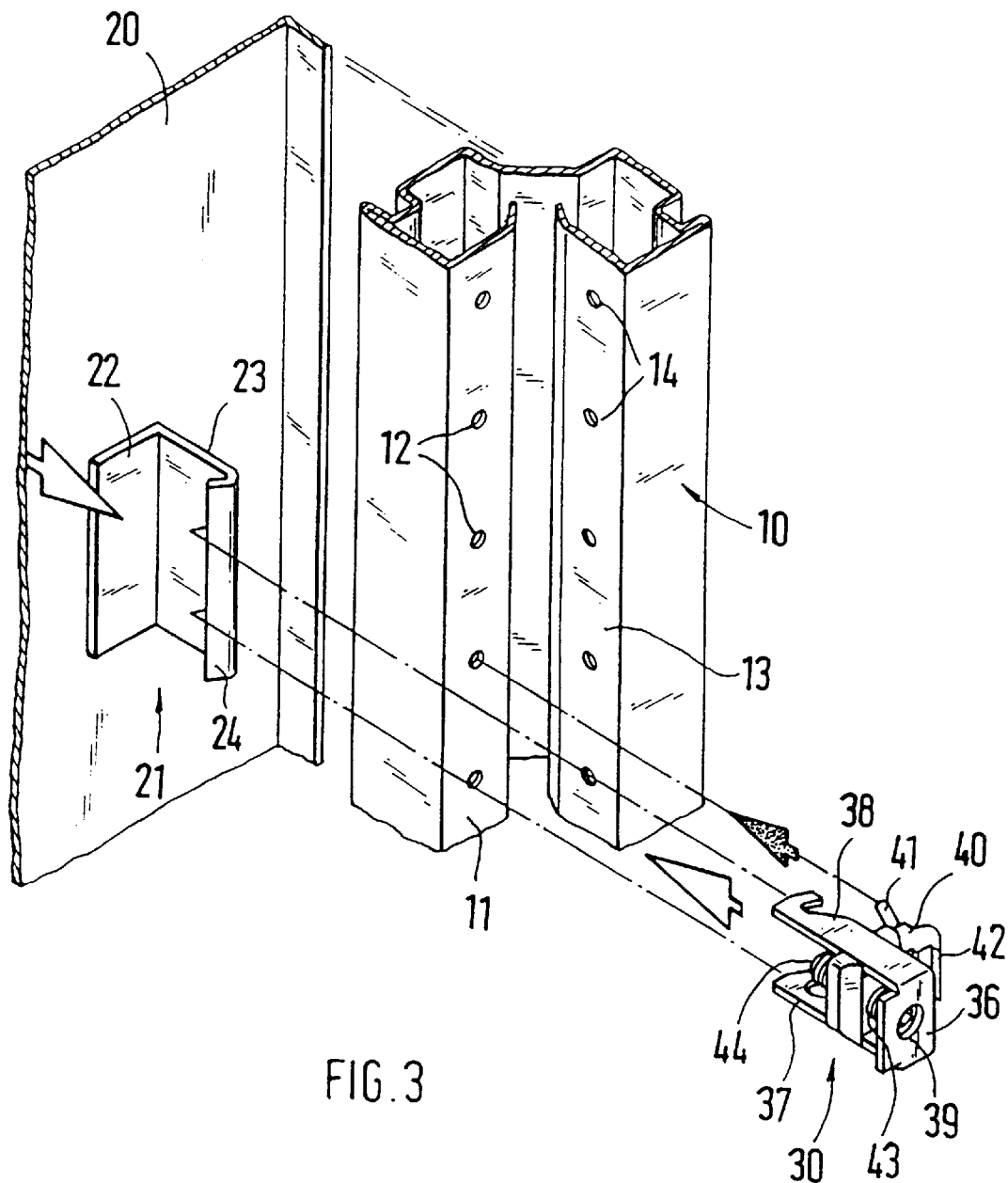
FIG. 3 is an exploded perspective view a fastening location with an adjustable counter hook element.

In the embodiment illustrated in FIG. 3, wall element 20 again remains unaltered. The clamp-like counter hook element 30, however, allows for adjustment and thereby a tightening of wall element 20 on rack member 10. Counter hook element 30 has a bore hole 39 in the base member 36, providing access to a set screw 44 secured in the clamp so as not to be lost. Two lateral members 37 and 38 project from base member 36 and have hook-shaped ends that allow them to receive end section 24 of hook element 21. A fastening block 40 is adjustably guided between lateral members 37 and 38. The adjustment of fastening block 40 takes place by means of set screw 44, which is screwed into a threaded bore 43 of fastening block 40. Fastening block 40 is provided with fixing pins 41 which can be inserted into fastening bore holes 12 of fastening surface 11 of rack member 10, said fastening surface extending parallel to wall element 20 so that fastening block 40 is definitely supported on fastening surface 10. By adjusting set screw 44, the counter hook element that is designed as a clamp is adjusted perpendicular to wall element 20 and tightened. Fastening block 40 projects laterally from lateral members 37 and 38, so that the clamp positions itself next to rack member 10.

After loosening the set screw, the hook connection can again be released and wall element 20 can again be taken off. Counter hook element 30 with fastening block 40 forms a removable and mountable unit.

Figure 4:
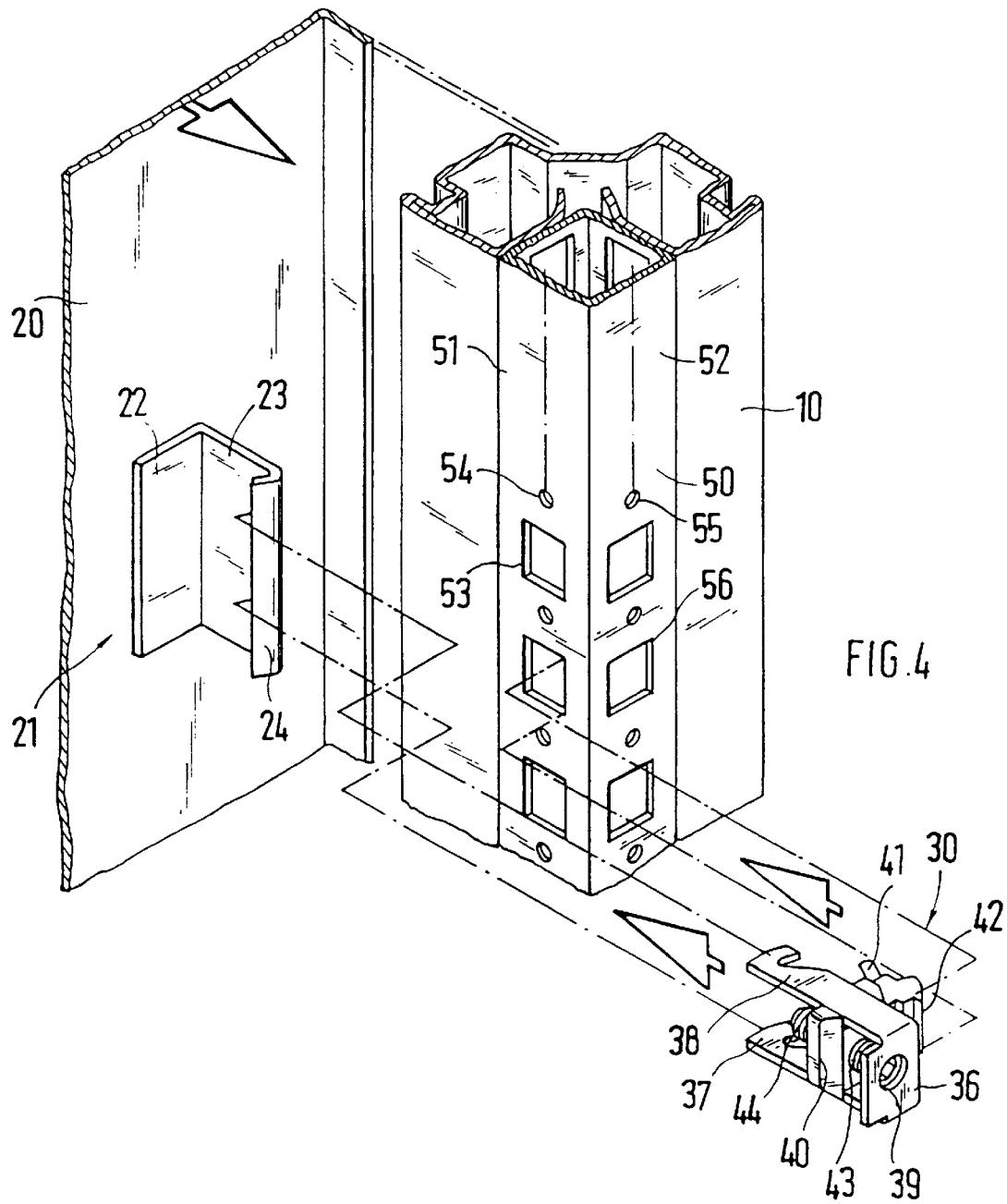
FIG. 4 is an illustration corresponding to FIG. 3, but showing another embodiment of the adjustable counter hook element on a mounting rail connected to the rack member.
Figure 5:
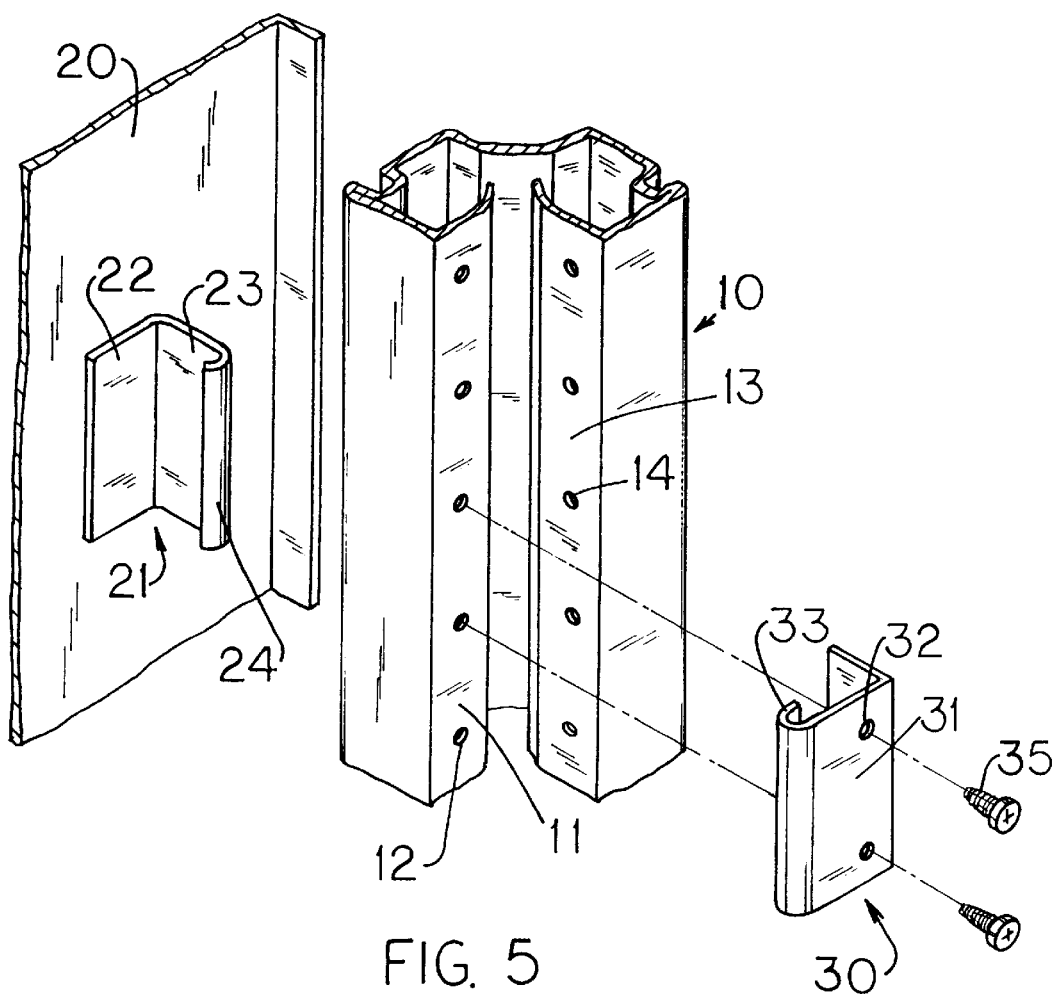
FIG. 5 shows another embodiment of the counter hook element.

The embodiment shown in FIG. 4 is distinguished only by the attachment of counter hook element 30. Wall element 20 and adjustable clamp counter hook element 30 remain unchanged. Fastening surfaces 11 and 13 of rack member 10 form a receptacle in which an essentially square and C-shaped mounting rail 50 is inserted flush. The profile sides of mounting rail 50 are provided with a series of fastening receptacles 53 or 56 with interposed fastening bore holes 54 or 55.

The support of fastening block 40 can take place by means of the insertion of fixing pins 41 in bore holes 55 of the profile side 52, or also through the insertion of a hook attachment 42 into fastening receptacle 53 of profile side 51 on mounting rail 50. Hook attachment 42 thereby hooks the side of fastening receptacle 53 that faces away from wall element 20. The tightening and loosening takes place as in the embodiment of FIG. 3 by means of the appropriate rotation of set screw 44.

What is claimed:

1. In a switch cabinet having (a) a wall element with a projecting hook element rigidly attached thereto, (b) a rack member, and (c) a counter hook element engaging the rack member and the projecting hook element, the improvement wherein:

the hook element is formed as an angled piece having an inner member rigidly connected to the wall element and an extension member being perpendicularly joined to the inner member and having a free edge spaced from the wall element and forming a hook bent inwardly toward the extension member; and the counter hook element includes a fastening plate attached to the rack member, wherein, the counter hook element engages the hook and the fastening plate extends from the rack member substantially parallel to the inner member.

2. The switch cabinet according to claim 1, wherein the counter hook element includes a threaded screw bearing against the rack member, thereby permitting adjustment of the counter hook element in a direction perpendicular to the wall element.

3. The switch cabinet according to claim 1 wherein:

the rack member has a fastening surface parallel to the wall element;

the fastening plate has a first side with a hook-shaped, inwardly bent counter end section;

the fastening plate is attached to the fastening surface; and the counter end section is in overlapping engagement with the hook.

4. The switch cabinet according to claim 1 wherein:

the rack member has a fastening surface perpendicular to the wall element;

the counter hook element is an angled piece having first and second members;

the first member is attached to the fastening surface; and the second member has a free end projecting away from the rack member and including an inwardly bent counter hook in overlapping engagement with the hook.

* * * * *